Oct. 2, 1923.
A. H. LAWRENCE
1,469,227
CYCLE, MOTOR CYCLE, AND ANALOGOUS SADDLE
Filed July 19, 1921    4 Sheets-Sheet 1
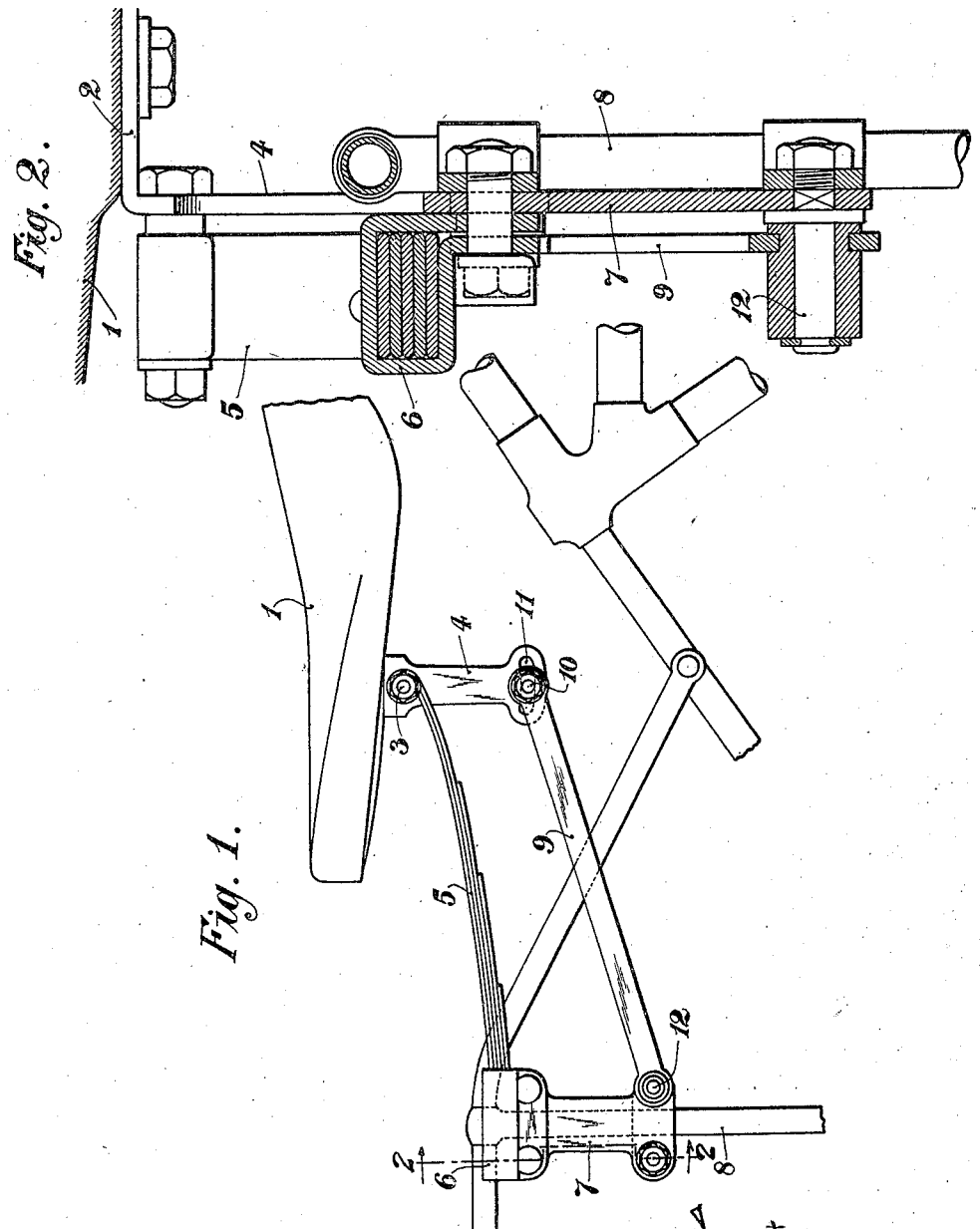

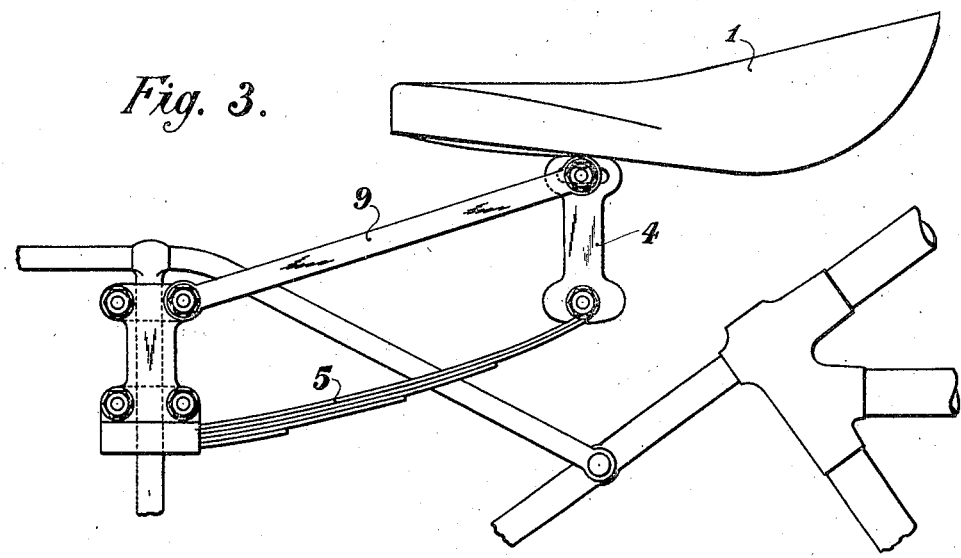
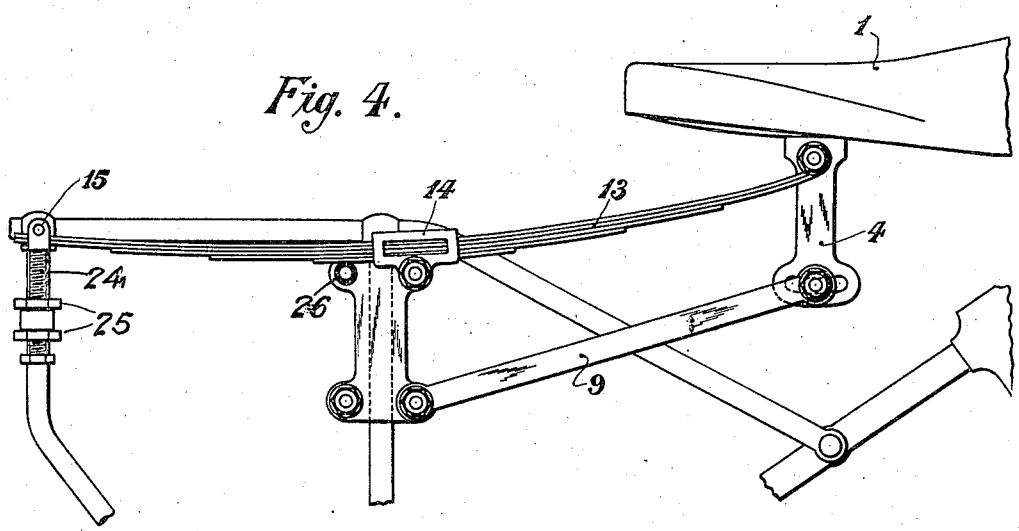

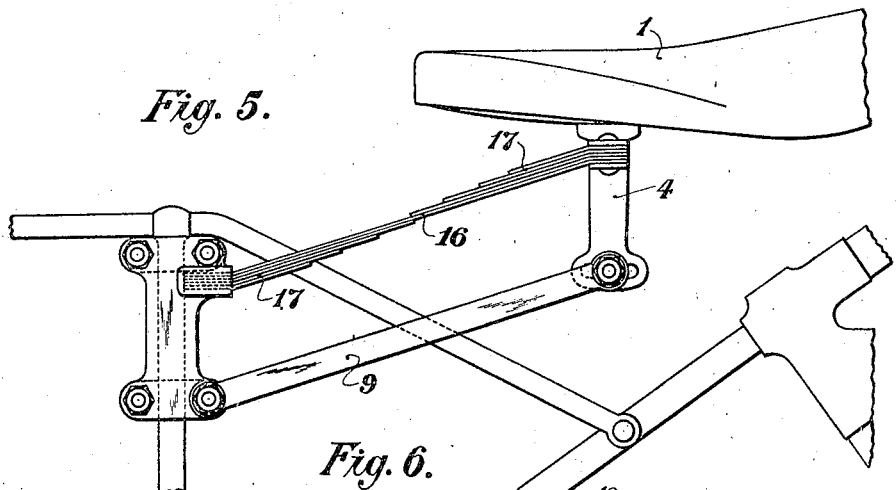
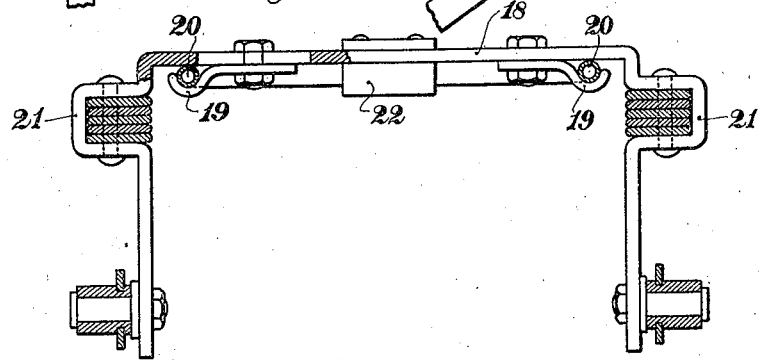
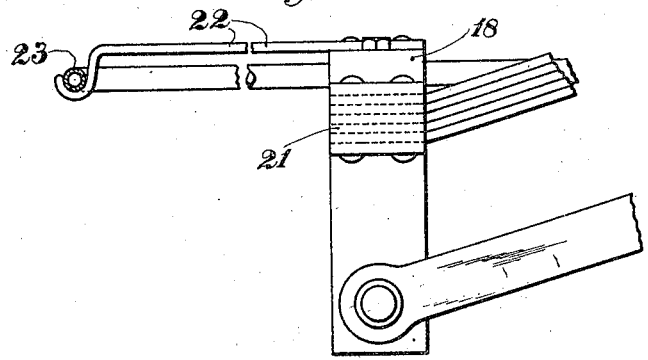

Oct. 2, 1923.  1,469,227
A. H. LAWRENCE
CYCLE, MOTOR CYCLE, AND ANALOGOUS SADDLE
Filed July 19, 1921    4 Sheets-Sheet 4
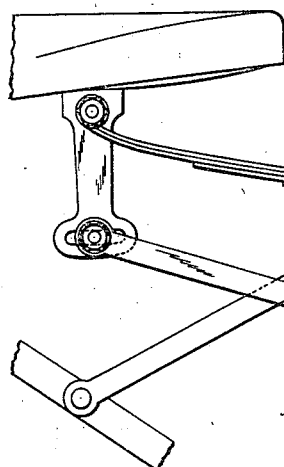
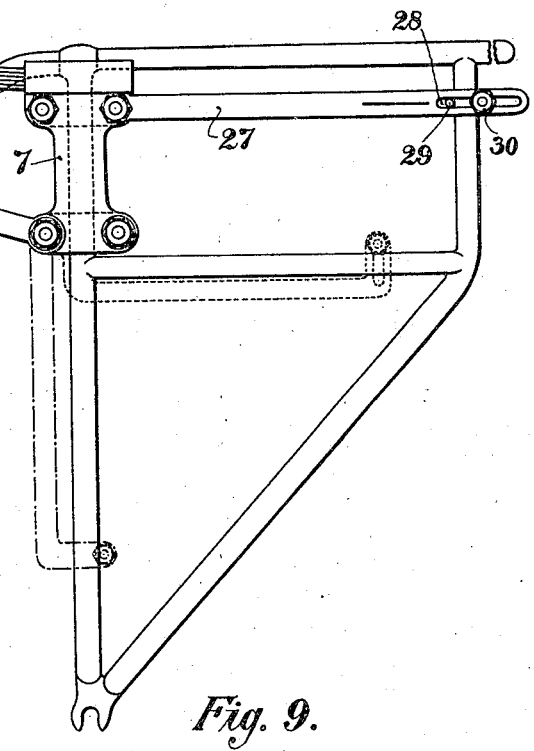
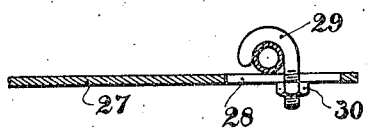

Patented Oct. 2, 1923.

1,469,227

UNITED STATES PATENT OFFICE.

ARTHUR HILLSTEAD LAWRENCE, OF BIRMINGHAM, ENGLAND, ASSIGNOR TO J. B. BROOKS AND COMPANY LIMITED, OF BIRMINGHAM, ENGLAND.

CYCLE, MOTOR CYCLE, AND ANALOGOUS SADDLE.

Application filed July 19, 1921. Serial No. 485,955.

(GRANTED UNDER THE PROVISIONS OF THE ACT OF MARCH 3, 1921, 41 STAT. L., 1313.)

*To all whom it may concern:*

Be it known that I, ARTHUR HILLSTEAD LAWRENCE, subject of the King of Great Britain, residing at Birmingham, England, have invented certain new and useful Improvements Relating to Cycle, Motor Cycle, and Analogous Saddles (for which I have filed an application in Great Britain on the 10th day of June, 1920, No. 15645/20), of which the following is a specification.

This invention relates to improvements in motor-cycle, cycle and analogous saddles of that type wherein the seat proper is supported upon a system of substantially parallel-motion members and has for its object to provide a saddle of this kind constructed in a more compact and simplified manner than heretofore.

According to this invention I provide a saddle wherein the top thereof is supported on either side upon a laminated leaf spring and a link disposed substantially parallel therewith, the spring being carried by a fixed part of the machine to which the rod or link is also pivoted.

Figure 1 is a side elevation of one form of the invention.

Figure 2 is a cross-section on the line 2—2 Figure 1 of one side of the apparatus.

Figure 3 is a side elevation of another form of the invention.

Figure 4 is a similar view to Figure 3 of yet another form of the invention.

Figure 5 shows a view similar to Figure 1 but employing a modified type of spring.

Figures 6 and 7 are a cross-section and side elevation respectively of an alternative method of mounting the springs and links upon the carrier of the machine.

Figures 8 and 9 are views showing alternative methods of taking the strain set up in the apparatus by a load placed upon the saddle.

In carrying out this invention as shown on the accompanying drawings at Figures 1 and 2, the saddle top 1 is mounted upon a bracket 2 having a depending portion 4 at each side of the saddle.

Upon the upper transverse pins 3 projecting from the depending portions 4 of the above-mentioned bracket the forward ends of quarter-elliptic canti-lever laminated leaf springs 5 are hinged one on either side of the saddle. The rear ends of these springs are rigidly secured to the carrier of the machine in any suitable manner. In the method shown at Figures 1 and 2 the rear ends of the springs are carried by clips 6 bolted to plates 7 which in turn are bolted to the stays 8 of the carrier.

Disposed beneath each of these springs and parallel thereto are rigid links 9 the forward ends of which are pivoted upon transverse bolts 10 mounted in arcuate slots 11 in the aforementioned depending portions 4 of the bracket 2 and situated directly beneath the upper transverse pins 3. By means of the slots 11 the tilt of the saddle may be varied. The rear ends of these links are pivoted as at 12 to the plate 7 beneath the point of attachment of the rear ends of the springs.

When a load is put upon the saddle top it moves downwardly, the links pivoting about their forward and rear ends and the springs being put in tension. When the load is released the springs return the saddle to its original position, any suitable form of stop being employed, if desired, to limit the upward movement of the springs.

Various modifications may be made in the construction without departing from the spirit of the invention. We may, for instance, as shown at Figure 3, dispose the links 9 above the springs 5 instead of below them as above described; also, compensated canti-lever springs 13 may be used as in Figure 4 in which case they would be pivoted to the carrier by means of clips 14, the rear ends abutting against suitable stops 15 which may, if desired, be made adjustable by means of the screw-shank 24 and nuts 25, so that the tension on the springs may be varied to suit the weights of different riders. Stops such as 26 may be provided to limit the upward movement of the saddle when the load is removed therefrom.

Instead of quarter-elliptic springs being employed as shown at Figures 1 and 3, the saddle-top may be supported at each side by parallel-motion springs such as shown at Figure 5. Each of these springs comprise a central leaf 16 extending from the saddle top to the carrier, the upper face of one end and the lower face of the other end being each built up with a series of laminations 17 so that the whole forms a double quarter-elliptic spring the built-up ends of which are connected respectively to the saddle top and to the carrier.

An alternative method of mounting the rear ends of the springs and links upon the carrier is shown at Figures 6 and 7. A U-shaped member 18 rests upon the carrier with the legs of same pointing downwardly and is secured to the longitudinal side members 20 of the carrier by means of clips 19. The links have their rear ends pivoted to the lower extremities of the legs of the member 18 while the rear ends of the springs are housed in pockets 21 formed in the upper portions of the said legs. To assist in taking the strain upon the apparatus by a load put upon the saddle, a hook member 22 is secured to the member 18 (as shown clearly at Figure 7) and adapted to engage one of the transverse members 23 of the carrier.

Alternative methods of assisting in taking the strain upon the apparatus are shown at Figures 8 and 9 and consist of rods 27 rigidly secured to the plates 7. The outer ends of these rods are provided with slots 28 in which are housed hooked bolts 29 adapted to clip on to the carrier-stays and to securely and rigidly clamp the rods thereto by means of the nuts 30 as is clearly shown at Figure 9. Alternative dispositions of the rods 27 are shown by dotted lines in Figure 8.

Having fully described my invention, what I desire to claim and secure by Letters Patent is:—

1. A motor-cycle, cycle or analogous saddle comprising a saddle top, parallel-motion link members, means for connecting the parallel-motion link members to the saddle top, and means for connecting the parallel motion link members to the machine, said parallel motion link members being disposed in upper and lower planes and consisting of a rigid link member pivoted at opposite ends and a leaf spring fixed at one end and pivoted at the other end and arranged substantially parallel to and cooperating with the rigid link member, so as to act as a parallel-motion link, in order to impart a parallel motion to the saddle top and at the same time support the load.

2. A motor-cycle, cyle or analogous saddle comprising a saddle top, a bracket adapted to be attached to the machine, parallel-motion members mounted upon the bracket and means for connecting the said parallel-motion members to the saddle top, said parallel-motion members being disposed in upper and lower planes, and consisting of a rigid link member pivoted at opposite ends and a leaf spring fixed at one end and pivoted at the other end and arranged substantially parallel to and co-operating with the rigid link member, so as to act as a parallel motion link in order to impart a parallel-motion to the saddle top and at the same time support the load.

3. A motor-cycle, cycle or analogous saddle comprising a saddle top, paralell-motion link members at each side of the saddle consisting of a rigid link and a leaf spring arranged in upper and lower planes, means for connecting the parallel-motion link members to the machine, a pair of members depending from the saddle top one at each side thereof, and means for connecting the parallel motion members to the depending members, the rigid link members being pivoted at opposite ends and the leaf spring members being fixed at one end and pivoted at the other end and arranged substantially parallel to and co-operating with the rigid link member, so as to act as parallel-motion links in order to impart a parallel-motion to the saddle top and at the same time support the load.

4. A motor-cycle, cycle or analogous saddle comprising a saddle top, parallel-motion link members consisting of a rigid link member pivoted at opposite ends and a compensated cantilever leaf spring pivoted at about its middle, means for pivotally connecting the rigid link and one end of the spring to the saddle top, means for mounting the rigid link and spring upon the machine, and a stop on the machine for engaging the tail end of the spring, the said spring co-operating with the rigid link member so as to act as a parallel-motion link in order to impart a parallel motion to the saddle top and at the same time to support the load.

5. A motor-cycle, cyle and analogous saddle comprising a saddle top supported at each side upon a compensated cantilever laminated leaf spring and a rigid non-flexible link disposed parallel therewith which constrain the saddle to move with a substantially parallel-motion, a pair of members depending from the saddle top one at each side thereof, means for mounting the depending members upon their respective springs and links, plates secured to a fixed part of the machine, means for pivotally mounting the springs and links upon their respective plates, and means for adjusting the tension upon the springs to suit the varying weights of different riders.

6. A motor-cycle, a cycle and analogous saddle comprising a saddle top support at each side upon a compensated cantilever laminated leaf spring and a rigid nonflexible link disposed parallel therewith which constrain the saddle to move with a substantially parallel motion, a pair of members depending from the saddle top one at each side thereof, means for mounting the depending members upon their respective springs and links, plates secured to a fixed part of the machine, means for pivotally mounting the springs and links upon their respective plates, means for adjusting the tension upon the springs to suit the varying weights of different riders, and stops upon the plates to limit the upward movement of the saddle-top when the load is released therefrom.

In testimony whereof I have hereunto set my hand.

ARTHUR HILLSTEAD LAWRENCE.